United States Patent
Werling

(10) Patent No.: US 12,252,138 B2
(45) Date of Patent: Mar. 18, 2025

(54) DRIVER ASSISTANCE SYSTEM

(71) Applicant: Bayerische Motoren Werke Aktiengesellschaft, Munich (DE)

(72) Inventor: Moritz Werling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 17/801,314

(22) PCT Filed: Jan. 26, 2021

(86) PCT No.: PCT/EP2021/051757
§ 371 (c)(1),
(2) Date: Aug. 22, 2022

(87) PCT Pub. No.: WO2021/175515
PCT Pub. Date: Sep. 10, 2021

(65) Prior Publication Data
US 2023/0106695 A1    Apr. 6, 2023

(30) Foreign Application Priority Data

Mar. 3, 2020  (DE) .................. 10 2020 105 711.3

(51) Int. Cl.
*B60W 30/095* (2012.01)
*B60W 30/12* (2020.01)
(Continued)

(52) U.S. Cl.
CPC .......... *B60W 40/105* (2013.01); *G06V 20/58* (2022.01); *B60W 2420/403* (2013.01); *B60W 2552/30* (2020.02); *B60W 2554/4049* (2020.02)

(58) Field of Classification Search
CPC ...... B60W 30/095; B60W 30/12; G06V 20/58
See application file for complete search history.

(56) References Cited

U.S. PATENT DOCUMENTS 5,467,284 A    11/1995   Yoshioka et al.
6,057,754 A    5/2000    Kinoshita et al.
(Continued)

FOREIGN PATENT DOCUMENTS

CN           208085705 U        11/2018
DE    10 2007 019 531 A1        11/2008
(Continued)

OTHER PUBLICATIONS

International Search Report (PCT/ISA/210) issued in PCT Application No. PCT/EP2021/051757 dated Apr. 26, 2021 with English translation (four (4) pages).
(Continued)

*Primary Examiner* — Long T Tran
(74) *Attorney, Agent, or Firm* — Crowell & Moring LLP

(57) ABSTRACT

A driver assistance system for a motor vehicle is configured to receive or determine maximum assumptions about a course of a roadway; to determine a maximum left lane boundary and a maximum right lane boundary for a roadway in which the motor vehicle is located according to the maximum assumptions; to detect at least one object which is located between the maximum left lane boundary and the maximum right lane boundary; and to take the at least one object into account in the driver assistance.

13 Claims, 1 Drawing Sheet

(51) Int. Cl.
    *B60W 40/105*     (2012.01)
    *G06V 20/58*     (2022.01)

(56) References Cited

U.S. PATENT DOCUMENTS

| | | | | |
|---|---|---|---|---|
| 9,177,476 | B2* | 11/2015 | Breed | H04W 4/024 |
| 9,555,803 | B2* | 1/2017 | Pawlicki | G01S 11/12 |
| 10,358,057 | B2* | 7/2019 | Breed | G05D 1/0278 |
| 2009/0216405 | A1 | 8/2009 | Kudo | |
| 2012/0010808 | A1 | 1/2012 | Yokoyama et al. | |
| 2012/0224062 | A1* | 9/2012 | Lacoste | G09G 5/14 |
| | | | | 348/148 |
| 2014/0018995 | A1 | 1/2014 | Ferguson et al. | |
| 2014/0314279 | A1* | 10/2014 | Zhang | G06T 7/74 |
| | | | | 382/104 |
| 2015/0028741 | A1* | 1/2015 | Schmidt | B60Q 1/1423 |
| | | | | 315/82 |
| 2017/0039856 | A1 | 2/2017 | Park | |
| 2017/0193338 | A1* | 7/2017 | Huberman | G06V 10/82 |
| 2017/0372150 | A1 | 12/2017 | Mayser | |
| 2018/0173970 | A1 | 6/2018 | Bayer et al. | |
| 2019/0226853 | A1* | 7/2019 | Kubiak | G06V 20/56 |
| 2020/0023772 | A1* | 1/2020 | Kurnaz | G06T 5/90 |
| 2020/0086855 | A1* | 3/2020 | Packer | G05D 1/0289 |
| 2020/0117921 | A1* | 4/2020 | Okada | G06V 20/588 |
| 2020/0182633 | A1* | 6/2020 | Liu | G01C 21/3407 |
| 2020/0290638 | A1* | 9/2020 | Damnjanovic | G08G 1/164 |
| 2022/0379883 | A1* | 12/2022 | Bruno | B60W 30/0956 |

FOREIGN PATENT DOCUMENTS

| | | |
|---|---|---|
| DE | 10 2010 049 214 A1 | 7/2011 |
| DE | 10 2015 202 099 A1 | 8/2016 |
| DE | 10 2015 209 467 A1 | 11/2016 |
| JP | 6-328989 A | 11/1994 |
| JP | 7-6291 A | 1/1995 |
| JP | 11-66494 A | 3/1999 |
| JP | 2009-202708 A | 9/2009 |
| JP | 2018-197964 A | 12/2018 |
| JP | 2019-87188 A | 6/2019 |
| JP | 2019-96039 A | 6/2019 |
| KR | 10-2014-0131601 A | 11/2014 |

OTHER PUBLICATIONS

German-language Written Opinion (PCT/ISA/237) issued in PCT Application No. PCT/EP2021/051757 dated Apr. 26, 2021 (eight (8) pages).
German-language Search Report issued in German Application No. 10 2020 105 711.3 dated Jul. 31, 2020 with partial English translation (12 pages).
Korean-language Office Action issued in Korean Application No. 10-2022-7026750 dated Oct. 21, 2024 with English translation (10 pages).
Japanese-language Office Action issued in Japanese Application No. 2022-550762 dated Oct. 30, 2024 with English translation (5 pages).

* cited by examiner

DRIVER ASSISTANCE SYSTEM

BACKGROUND AND SUMMARY

The invention relates to a driver assistance system and a method.

Within the scope of this document, the term "automated driving" may be understood to mean driving with automated longitudinal guidance or lateral guidance, or autonomous driving with automated longitudinal guidance and lateral guidance. The term "automated driving" encompasses automated driving with any degree of automation. Exemplary degrees of automation are assisted, partially automated, highly automated or fully automated driving. These degrees of automation have been defined by the Bundesanstalt für Straßenwesen (BASt—German Federal Highway Research Institute) (see BASt publication Forschung kompakt, issue 11/2012). In the case of assisted driving, the driver implements the longitudinal guidance or lateral guidance permanently, while the system takes over the respective other function within certain limits. In the case of partially automated driving, the system takes over the longitudinal guidance and lateral guidance for a certain period of time and/or in specific situations, whereby the driver has to monitor the system permanently, as in the case of assisted driving. In the case of highly automated driving, the system takes over the longitudinal guidance and lateral guidance for a certain period of time, without the driver having to monitor the system permanently; but the driver has to be capable of taking over the guidance of the vehicle within a certain time. In the case of fully automated driving, the system can automatically manage the driving in all situations for a specific application; no driver is required any longer for this application. The aforementioned four degrees of automation according to the definition given by the BASt correspond to SAE Levels 1 to 4 of the SAE J3016 standard (SAE—Society of Automotive Engineering). For instance, highly automated driving according to the BASt corresponds to Level 3 of the SAE J3016 standard. Furthermore, SAE Level 5 is provided in SAE J3016 as the highest degree of automation, which is not included in the definition given by the BASt. SAE Level 5 corresponds to driverless driving, in which the system can automatically cope with all situations like a human driver during the entire journey; a driver is generally no longer required.

Driver assistance systems are reliant on detecting whether an object in the direction of travel is located on the same roadway as a motor vehicle. In this case, the driver assistance system would react to the object and, for instance, warn the driver of the motor vehicle, or automatically lessen a danger originating from the object.

A known problem in this connection is the erroneous assignment of objects to roadways. If, for instance, an object is erroneously assigned to a roadway other than that of the motor vehicle, a dangerous situation may arise.

It is a task of the invention to prevent dangers posed by erroneously assigned objects.

The task is achieved by the features of the independent claims. Advantageous embodiments are described in the dependent claims. Attention is drawn to the fact that additional features of a claim that is dependent on an independent claim without the features of the independent claim, or only in combination with a subset of the features of the independent claim, may constitute a separate invention that is independent of the combination of all the features of the independent claim and that may be made the subject-matter of an independent claim, of a divisional application or of a subsequent application. This applies equally to technical teachings described in the description, which may constitute an invention that is independent of the features of the independent claims.

A first aspect of the invention relates to a driver assistance system for a motor vehicle.

The driver assistance system has been s to receive or to ascertain maximum assumptions about a course of a roadway.

The roadway is, in particular, a lane—that is to say, the area that is available to a vehicle for travel in one direction. Alternatively, the roadway is a divided highway with several lanes. Alternatively, the roadway is a highway that comprises several lanes or divided highways.

Alternatively, particularly in the context of a lane-change maneuver, the roadway is the lane in which the motor vehicle is located and the lane to which the motor vehicle wishes to change.

The maximum assumptions include, in particular, assumptions about a maximum curvature of a roadway, a maximum curvature of a roadway as a function of the maximum speed permitted on this roadway, a maximum change in a curvature of a roadway, and/or a maximum change in a curvature of a roadway as a function of the maximum speed permitted on this roadway.

In addition, the driver assistance system has been configured to ascertain, as a function of the maximum assumptions, a maximum left-hand roadway edge and a maximum right-hand roadway edge for a roadway on which the motor vehicle is located.

The insight underlying the invention in this connection is that highways and/or roadways are planned taking certain maximum assumptions into account, in order to make safe highway traffic possible thereon. Consequently, taking these maximum assumptions into account, a worst-case course of a highway or roadway to the left and to the right can be determined.

The maximum left-hand roadway edge and the maximum right-hand roadway edge can consequently be determined independently of the actual course of the highway or roadway. This is particularly advantageous, since a course of a highway or roadway that has been determined, for example, by means of sensors or by means of a map of the surroundings may have been determined incorrectly, for instance due to impaired sensorics (perhaps a camera blinded by the sun) or due to an obsolete map of the surroundings.

In addition, the driver assistance system has been configured to detect at least one object that is located between the maximum left-hand roadway edge and the maximum right-hand roadway edge, and to take the at least one object into account in the course of the driver assistance. In particular, the driver assistance system has been configured to detect at least one further object that is not located between the maximum left-hand roadway edge and the maximum right-hand roadway edge, and to disregard the at least one further object in the course of the driver assistance, in order to avoid unnecessary braking.

The at least one object and the at least one further object are each, for instance, a classified object. Alternatively, it is a question of, for instance, an unclassified obstacle.

In particular, the driver assistance system has been configured to take the at least one object into account in the course of the driver assistance, by the driver of the motor vehicle being informed about the at least one object, and/or by the speed of the motor vehicle being adjusted as a function of the at least one object.

In an advantageous embodiment, the driver assistance system has been configured to ascertain a validated horizon in the direction of travel ahead of the motor vehicle.

The validated horizon delimits a zone in the direction of travel ahead of the motor vehicle, in which, with high integrity and performance, sensor information and/or map information that is available to the driver assistance system is correct. This can be achieved, for instance, by the zone as far as the validated horizon being registered and processed by several redundant sensors. Alternatively, the plausibility of an item of map information can also be checked with at least one item of sensor information.

The validated horizon generally delimits a zone around the motor vehicle that is covered by the sensors of the motor vehicle with high integrity and performance. Depending upon the orientation of the sensors on the motor vehicle, this zone may also be situated alongside or behind the motor vehicle.

The driver assistance system has been configured to ascertain the maximum left-hand roadway edge and the maximum right-hand roadway edge in such a manner that these edges adjoin the validated horizon after the latter in the direction of travel.

The insight underlying the invention in this connection is that the zone between the vehicle and the validated horizon is known with high integrity. Therefore the worst-case estimation of the roadway edges is not necessary in this zone.

In another advantageous embodiment, the validated horizon is substantially the leading edge of the motor vehicle. This is the case when no zone ahead of the vehicle can be registered with high integrity.

In another, alternative, embodiment, the driver assistance system has been configured to detect, by means of sensors, the roadway on which the motor vehicle is located for a stretch in the direction of travel ahead of the motor vehicle, and to ascertain the validated horizon in the direction of travel ahead of the motor vehicle in such a manner that the validated horizon adjoins this stretch ahead of the motor vehicle.

In another advantageous embodiment, the driver assistance system has been configured to record first sensor information by means of a first camera positioned in the direction of travel, and/or by means of a laser scanner.

In another advantageous embodiment, the driver assistance system has been configured to receive a map of the surroundings around the motor vehicle and to detect the roadway on which the motor vehicle is located for a stretch in the direction of travel ahead of the motor vehicle by checking the plausibility of the map of the surroundings and of the first sensor information.

The map of the surroundings may, for instance, have been stored in the motor vehicle and/or may be received from a back-end external to the vehicle.

In another advantageous embodiment, the driver assistance system has been configured to record second sensor information by means of a second camera positioned substantially orthogonally relative to the direction of travel, and/or by means of a laser scanner, and to detect the roadway on which the motor vehicle is located for a stretch in the direction of travel ahead of the motor vehicle by checking the plausibility of the first sensor information and of the second sensor information.

Alternatively, the driver assistance system has been configured to detect the roadway on which the motor vehicle is located for a stretch in the direction of travel ahead of the motor vehicle by checking the plausibility of the image information of a second camera positioned substantially to the left, orthogonally relative to the direction of travel, and of the image information of a second camera positioned substantially to the right, orthogonally relative to the direction of travel. Here the image information of the first camera is not necessary.

In another advantageous embodiment, the driver assistance system has been configured to record third sensor information by means of a third camera positioned contrary to the direction of travel, and/or by means of a laser scanner, and to detect the roadway on which the motor vehicle is located for a stretch in the direction of travel ahead of the motor vehicle by checking the plausibility of the first sensor information and of the third sensor information. The insight underlying the invention in this connection is that, particularly in the case of large curve radii, a camera positioned contrary to the direction of travel can also contribute to detecting a roadway ahead of the motor vehicle.

In another advantageous embodiment, the driver assistance system has been configured to ascertain the geometry—that is to say, in particular, the orientation—of the motor vehicle in the roadway on which the motor vehicle is located, and to ascertain the maximum left-hand roadway edge and the maximum right-hand roadway edge additionally as a function of the orientation of the motor vehicle in the roadway on which the motor vehicle is located.

The insight underlying the invention in this connection is that, by taking into account the geometry and, in particular, the orientation of the motor vehicle in the roadway, the zone between the maximum left-hand roadway edge and the maximum right-hand roadway edge can be made smaller, resulting in a lessening of erroneously detected objects.

In another advantageous embodiment, the driver assistance system has been configured to receive a map of the surroundings around the motor vehicle, to ascertain whether the at least one object according to the map of the surroundings is located on the same roadway as the motor vehicle, and to take the at least one object into account in the course of the driver assistance as a function of whether the object is located on the same roadway as the motor vehicle.

In particular, the driver assistance system has been configured to take the at least one object into account in the course of the driver assistance in a first way if the object is located on the same roadway as the motor vehicle, and to take the at least one object into account in the course of the driver assistance in a second way, different from the first way, if the object is not located on the same roadway as the motor vehicle.

If, for instance, the driver assistance system is operating the motor vehicle in automated manner, then if the at least one object is located on the same roadway as the motor vehicle the speed of the motor vehicle can be reduced with a first gradient. If the at least one object is not located on the same roadway as the motor vehicle, the speed of the motor vehicle can be reduced with a second gradient, the second gradient being less steep than the first gradient.

The insight underlying the invention in this connection is that the detection of whether the at least one object is located on the same roadway as the motor vehicle may indeed be subject to error. However, this detection is also not always false. Practice has shown that this detection is even correct in most cases. In both cases described, the at least one object is located between the maximum left-hand roadway edge and the maximum right-hand roadway edge and consequently represents a collision risk in the worst case.

However, in the case where the at least one object is located on the same roadway as the motor vehicle, the risk of collision is higher than in the case where the at least one object is not located on the same roadway as the motor vehicle.

Consequently, in terms of a trade-off between safety and ride comfort, it is possible to decelerate the motor vehicle less intensely in the case of an object that has not been detected as being in the same roadway as the motor vehicle than in the case of an object that has been detected as being in the same roadway as the motor vehicle.

For instance, in the case where the at least one object is located on the same roadway as the motor vehicle, the deceleration could be chosen in such a manner that a collision of the motor vehicle with the at least one object is prevented.

For instance, in the case where the at least one object is not located on the same roadway as the motor vehicle, the deceleration could be chosen in such a manner that, although a collision of the motor vehicle with the at least one object is not prevented, the effects of a possible collision are limited in such a manner that no serious damage arises.

In another advantageous embodiment, the driver assistance system has been configured to receive or to ascertain various maximum assumptions about a course of a roadway as a function of various degrees of collision severity, to ascertain, as a function of these maximum assumptions for each of the degrees of collision severity, a maximum left-hand roadway edge and a maximum right-hand roadway edge for a roadway on which the motor vehicle is located, to detect at least one object that is located between these pairs of maximum left-hand roadway edges and maximum right-hand roadway edges, and to take the at least one object into account in the course of the driver assistance as a function of the respective degree of collision severity.

The insight underlying the invention in this connection is that a very severe collision has to be prevented with higher probability than a less severe collision. Therefore, if collisions have been excluded within a narrow band between the maximum left-hand roadway edge and the maximum right-hand roadway edge, it is sensible to exclude collisions above a certain severity of damage additionally in a wider zone.

A second aspect of the invention relates to a method for assisting a driver of a motor vehicle.

One step of the method is the ascertaining of maximum assumptions about a course of a roadway.

A further step of the method is the ascertaining, as a function of the maximum assumptions, of a maximum left-hand roadway edge and a maximum right-hand roadway edge for a roadway on which the motor vehicle is located.

A further step of the method is the detecting of at least one object that is located between the maximum left-hand roadway edge and the maximum right-hand roadway edge. If it is unclear whether the at least one object is located between the maximum left-hand roadway edge and the maximum right-hand roadway edge, for instance because the object is at least partially obscured, for the sake of safety it can be assumed that the at least one object is located between the maximum left-hand roadway edge and the maximum right-hand roadway edge and is not moving.

A further step of the method is the taking into account of the at least one object in the course of the driver assistance.

The foregoing statements relating to the driver assistance system according to the invention as defined by the first aspect of the invention apply in corresponding manner also to the method according to the invention as defined by the second aspect of the invention. Advantageous exemplary embodiments of the method according to the invention not explicitly described at this point and in the claims correspond to the advantageous exemplary embodiments of the driver assistance system according to the invention described above or described in the claims.

The invention is described below with reference to an exemplary embodiment with the aid of the appended drawings.

DETAILED DESCRIPTION OF THE DRAWINGS

Figure 1:
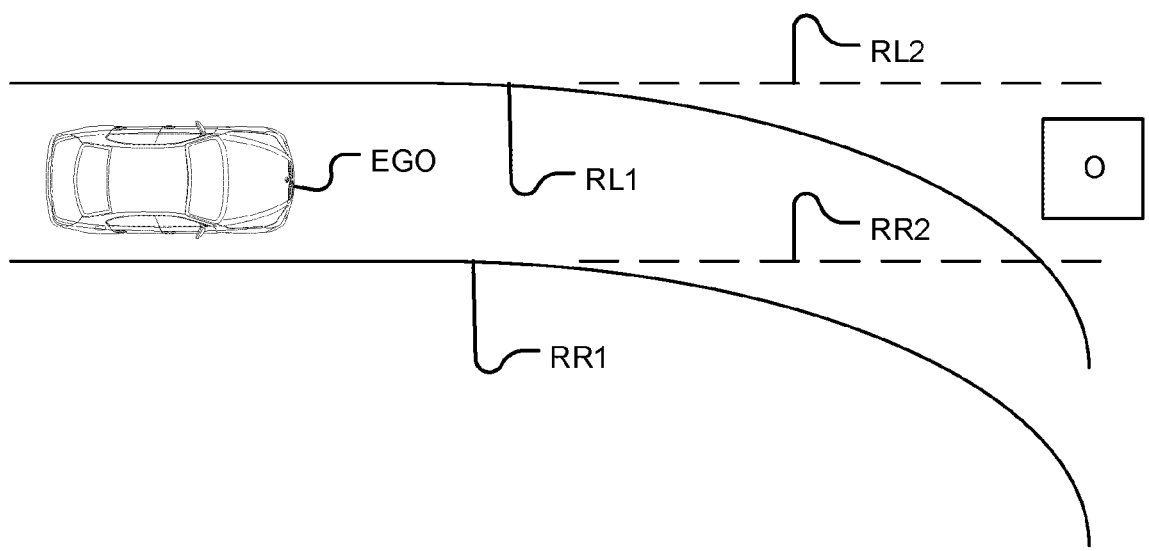
FIG. 1 illustrates a traffic situation for illustrating the state of the art.

FIG. 1 shows an exemplary traffic situation for illustrating the state of the art. In this situation, the motor vehicle EGO is located on a roadway.

A conventional driver assistance system has erroneously determined that the roadway describes a right-hand curve with left-hand roadway edge RL1 and right-hand roadway edge RR1. But the roadway is in fact a straight line with left-hand roadway edge RL2 and right-hand roadway edge RR2.

An object O is located on the actual roadway in the direction of travel ahead of the motor vehicle EGO. However, due to the incorrect determination of the roadway by the conventional driver assistance system, the object O is not taken into account by the driver assistance system, for instance by the speed of the motor vehicle EGO being adjusted.

Even if the conventional driver assistance system detects the correct roadway edges RL2 and RR2 in a later time-step, it may then already be too late for a reaction to the object O, since the distance between the motor vehicle EGO and the object O may then already be very short for the speed being traveled at.

Figure 2:
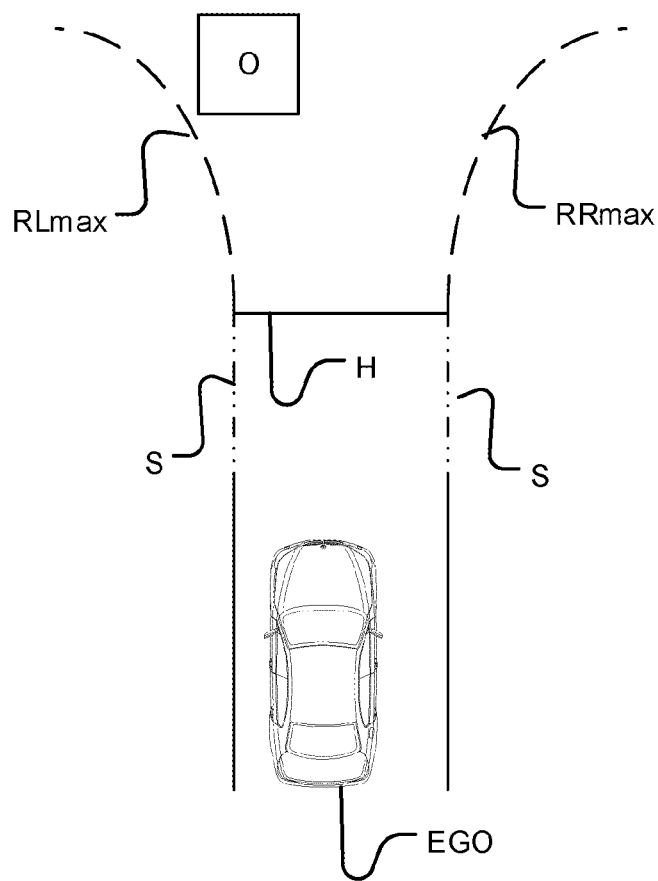
FIG. 2 illustrates a traffic situation for illustrating one embodiment of the invention.

FIG. 2 shows a traffic situation for illustrating an embodiment of the invention. A motor vehicle EGO with a driver assistance system can be seen. The driver assistance system has been configured to receive or to ascertain maximum assumptions about a course of a roadway.

The maximum assumptions include, for instance, assumptions about a maximum curvature of a roadway, a maximum curvature of a roadway as a function of the maximum speed permitted on this roadway, a maximum change in a curvature of a roadway, and/or a maximum change in a curvature of a roadway as a function of the maximum speed permitted on this roadway.

In addition, the driver assistance system has been configured to ascertain, as a function of the maximum assumptions, a maximum left-hand roadway edge RLmax and a maximum right-hand roadway edge RRmax for a roadway on which the motor vehicle EGO is located.

Over and above this, the driver assistance system has been configured to ascertain a validated horizon H in the direction of travel ahead of the motor vehicle EGO and to ascertain the maximum left-hand roadway edge RLmax and the maximum right-hand roadway edge RRmax in such a manner that these edges adjoin the validated horizon H after the latter in the direction of travel.

The driver assistance system has been configured to detect, by means of sensors, the roadway on which the motor vehicle EGO is located for a stretch S in the direction of travel ahead of the motor vehicle EGO, and to ascertain the validated horizon H in the direction of travel ahead of the motor vehicle EGO in such a manner that the validated horizon H adjoins this stretch S ahead of the motor vehicle EGO.

For instance, the driver assistance system has been configured to record first sensor information by means of a first camera positioned in the direction of travel, to receive a map of the surroundings around the motor vehicle EGO, and to detect the roadway on which the motor vehicle EGO is located for a stretch S in the direction of travel ahead of the motor vehicle EGO by checking the plausibility of the map of the surroundings and of the first sensor information.

In addition, the driver assistance system has been configured to detect at least one object O that is located between the maximum left-hand roadway edge RLmax and the maximum right-hand roadway edge RRmax, and to take the at least one object O into account in the course of the driver assistance, for instance by the driver of the motor vehicle EGO being informed about the at least one object O, and/or by the speed of the motor vehicle EGO being adjusted by the driver assistance system as a function of the at least one object O.

The invention claimed is:

1. A system for a motor vehicle, comprising:
   a driver assistance system operatively configured to:
   receive or determine maximum assumptions about a course of a roadway ahead of the motor vehicle, the maximum assumptions including a maximum curvature of the roadway, a maximum curvature of the roadway as a function of a maximum speed permitted on the roadway, a maximum change in a curvature of the roadway, and a maximum change in the curvature of the roadway as a function of the maximum speed permitted on the roadway;
   determine, as a function of the maximum assumptions and independently of an actual course of the roadway, a maximum left-hand roadway edge and a maximum right-hand roadway edge for the roadway on which the motor vehicle is located;
   detect at least one object that is located between the maximum left-hand roadway edge and the maximum right-hand roadway edge; and
   take the at least one object into account in performing driver assistance.

2. The system according to claim 1, wherein the driver-assistance system is further configured to:
   determine a validated horizon in a direction of travel ahead of the motor vehicle, and
   determine the maximum left-hand roadway edge and the maximum right-hand roadway edge in such a manner that said edges adjoin the validated horizon after the latter in the direction of travel.

3. The system according to claim 2, wherein the validated horizon is substantially a leading edge of the motor vehicle.

4. The system according to claim 2, wherein the driver-assistance system is further configured to:
   detect, via at least one sensor, the roadway on which the motor vehicle is located for a stretch in the direction of travel ahead of the motor vehicle; and
   determine the validated horizon in the direction of travel ahead of the motor vehicle in such a manner that the validated horizon adjoins said stretch ahead of the motor vehicle.

5. The system according to claim 4, wherein the driver-assistance system is further configured to:
   record first sensor information by way of a first camera positioned in the direction of travel, and/or by way of a laser scanner.

6. The system according to claim 5, wherein the driver-assistance system is further configured to:
   receive a map of the surroundings around the motor vehicle; and
   detect the roadway on which the motor vehicle is located for a stretch in the direction of travel ahead of the motor vehicle by checking a plausibility of a map of the surroundings and of the first sensor information.

7. The system according to claim 5, wherein the driver-assistance system is further configured to:
   record second sensor information by way of a second camera positioned orthogonally relative to the direction of travel, and/or by way of a laser scanner; and
   detect the roadway on which the motor vehicle is located for a stretch in the direction of travel ahead of the motor vehicle by checking a plausibility of the first sensor information and of the second sensor information.

8. The system according to claim 5, wherein the driver-assistance system is further configured to:
   record third sensor information by way of a third camera positioned contrary to the direction of travel, and/or by way of a laser scanner; and
   detect the roadway on which the motor vehicle is located for a stretch in the direction of travel ahead of the motor vehicle by checking a plausibility of the first sensor information and of the third sensor information.

9. The system according to claim 1, wherein
   the driver-assistance system is further configured to take the at least one object into account in the course of the driver assistance, by:
   informing a driver of the motor vehicle about the at least one object, and/or
   adjusting a speed of the motor vehicle as a function of the at least one object.

10. The system according to claim 1, wherein the driver-assistance system is further configured to:
    determine an orientation of the motor vehicle in the roadway on which the motor vehicle is located; and
    determine the maximum left-hand roadway edge and the maximum right-hand roadway edge additionally as a function of the orientation of the motor vehicle in the roadway on which the motor vehicle is located.

11. The system according to claim 1, wherein the maximum assumptions comprise assumptions about:
    a maximum curvature of a roadway,
    a maximum curvature of a roadway as a function of the maximum speed permitted on this roadway,
    a maximum change in a curvature of a roadway, and/or
    a maximum change in a curvature of a roadway as a function of the maximum speed permitted on this roadway.

12. The system according to claim 1, wherein the driver-assistance system is further configured to:
    receive a map of the surroundings around the motor vehicle;
    determine whether the at least one object according to the map of the surroundings is located on the same roadway as the motor vehicle; and
    take the at least one object into account in the course of the driver assistance as a function of whether the object is located on the same roadway as the motor vehicle.

13. A method for assisting a driver of a motor vehicle, the method comprising:

determining maximum assumptions about a course of a roadway ahead of the motor vehicle, the maximum assumptions including a maximum curvature of the roadway, a maximum curvature of the roadway as a function of a maximum speed permitted on the roadway, a maximum change in a curvature of the roadway, and a maximum change in the curvature of the roadway as a function of the maximum speed permitted on the roadway;

determining, as a function of the maximum assumptions and independently of an actual course of the roadway, a maximum left-hand roadway edge and a maximum right-hand roadway edge for a roadway on which the motor vehicle is located;

detecting at least one object that is located between the maximum left-hand roadway edge and the maximum right-hand roadway edge; and taking the at least one object into account in the driver assistance.

* * * * *